3,296,302
TRICHLOROVINYLSULFENYL CHLORIDE AND PROCESS FOR THE PRODUCTION OF TRIHALOVINYLSULFENYL CHLORIDE
Edward D. Weil, Lewiston, Keith J. Smith, Lockport, and Emil J. Geering, Grand Island, N.Y., assignors to Hooker Chemical Corporation, Niagara Falls, N.Y., a corporation of New York
No Drawing. Filed Nov. 16, 1959, Ser. No. 852,931
2 Claims. (Cl. 260—543)

This invention relates to new compositions of matter and their methods of manufacture. More specifically this invention resides in a new group of chemical compounds characterized as trihalovinylsulfenyl halides. The compounds of this invention may be characterized by the following general formula:

$$CX_2=CX-SX$$

where X is a halogen, preferably chlorine or bromine.

Included within the scope of the invention are trichlorovinylsulfenyl chloride, trichlorovinylsulfenyl bromide, bromodichlorovinylsulfenyl chlorides, dibromochlorovinylsulfenyl bromides, tribromovinylsulfenyl chloride, and tribromovinylsulfenyl bromide. The corresponding sulfenyl iodides are preparable transitorily but appear to be generally unstable and break down at ordinary temperatures with release of iodine.

The compounds of the invention represent the first known examples of a new class of compounds comprising sulfenyl halides having aliphatic carbon-to-carbon double bonds. The existence of such compounds as isolatable substances is surprising; in fact their nonexistence would have been predicted on the basis of the prior art which teaches that sulfenyl chlorides react readily with aliphatic unsaturation to form 2-chloroalkyl sulfide structures, i.e. one would have expected the compounds of the invention to dimerize or polymerize immediately.

The novel compounds of the present invention while stable per se, are reactive with many substances, including oxygen and oxidizing agents such as nitric acid and hydrogen peroxide to form the corresponding sulfinic and sulfonic derivatives, with chlorine and bromine to obtain pentahalosulfenyl halides, with nucleophilic anions which generally first replace the halogen on the sulfur atom, with nitrogen bases bearing a replaceable hydrogen or metal on the nitrogen atom which generally replace the halogen on the sulfur atom by a nitrogen-containing radical, with reducing agents such as hydriodic acid which generally produce the disulfide corresponding to the sulfenyl chloride, with aromatic compounds to produce trichlorovinyl aryl sulfides, with olefins (which may include unsaturated resins and unsaturated natural oils) to produce 2-haloalkyl sulfides, with acetylenes to produce 2-halovinyl sulfides, with hydrogen sulfides to produce the tri- and polysulfides corresponding to the sulfenyl halide, with organic phosphites to produce, inter alia, S-trihalovinyl phosphorothiolates, and with carbanions to produce trihalovinyl alkyl sulfides. The above-cited reactions are not intended to be limiting but are intended to indicate the wide scope of utility of these new compounds as chemical intermediates. Many of these derivatives have pesticidal utility. Others have utility as extreme pressure lubricant additives.

In addition, the compounds of the invention have surprisingly high biological activity per se and have utility for the fumigational control of undesirable soil organisms such as nematodes.

The compounds of the invention are preferably synthesized either by dehydrohalogenation of tetrahaloethyl sulfenyl halides or by the chlorinolysis of trihalovinyl disulfides (or higher polysulfides). The sulfenyl bromides may also be prepared from the sulfenyl chlorides by halogen exchange methods such as the reaction of hydrogen bromide with the sulfenyl chloride.

Trichlorovinylsulfenyl chloride may be prepared, for example, by chlorinolysis of bis(trichlorovinyl)disulfide, dichlorobromovinylsulfenyl chloride by chlorinolysis of bis(dibromochlorovinyl)disulfide, and dibromochlorovinylsulfenyl chloride by chlorinolysis of bis(dibromochlorovinyl)disulfide. If trisulfides or higher polysulfides are used, sulfur chlorides are formed as byproducts. Monosulfides do not undergo this chlorinolysis reaction. The chlorinolysis may, if desired, be accelerated by the use of catalysts such as iodine or Lewis acids.

To further illustrate the invention, the following examples are given:

*Example 1.—Synthesis of trichlorovinylsulfenyl chloride*

Starting material bis(trichlorovinyl)disulfide can be prepared by heating bis(tetrachloroethyl)disulfide in the presence of ferric chloride (the synthesis of which is fully described in a copending application). To 29 parts of this bis(trichlorovinyl)disulfide at —20° C. was added 6.3 parts of chlorine. The mixture (35 parts) was allowed to warm slowly to room temperature and then was distilled through a short fractionating column to obtain 27 parts of trichlorovinylsulfenyl chloride, a red malodorous liquid boiling at 39–45° C. (0.3–0.5 mm.). The infrared spectrum showed the presence of a double bond at 6.55 mu. The presence of the sulfenyl function was proved by the release of iodine from potassium iodide solution immediately upon admixture of the product.

Analysis.—Calcd. for $C_2Cl_4S$: Cl, 71.8; S, 16.2. Found: Cl, 72.0; S, 15.7.

*Example 2*

To a solution of 23.5 parts of tetrachloroethyl sulfenyl chloride in 30 parts of chloroform at 20° C. was added a solution of 10 parts of triethylamine in 120 parts of chloroform. After four hours the mixture was washed quickly with cold water, and rapidly stripped under water pump vacuum leaving 18 parts of trichlorovinylsulfenyl chloride having the identical infrared spectrum to the product of Example 1.

The use of the compounds of the invention as chemical intermediates to prepare valuable derivatives is illustrated by the following example:

*Example 3*

To 14.6 parts of phthalimide and 10.1 parts of triethylamine in 120 parts of chloroform at 20° C. was added 20 parts of trichlorovinylsulfenyl chloride, as prepared in Example 2. After four hours with continuous stirring, the mixture was quickly washed with cold water to remove triethylamine hydrochloride, then evaporated to about one-half volume, filtered to remove some unreacted phthalimide, then the filtrate evaporated to dryness. The crude product was recrystallized from carbon tetrachloride to obtain 13 parts of a light tan crystalline product, melting point 133–5° C., and having the correct chlorine analysis for N-trichlorovinylmercapto phthalimide.

Analysis.—Calcd. for $C_{10}H_4Cl_3NO_2$: N, 4.54. Found: N, 4.76.

The product has utility as a fungicide. For example, when applied at the rate of 50 mg. to a 3 inch pot of soil infested with *Pythium ultimum*, this compound completely prevented the damping-off of pea seedlings. Similarly prepared was N-trichlorovinylmercaptotetrahydrophthalimide, also a fungicide.

The use of the compounds of the invention as pesticidal fumigants is illustrated by the following example.

Example 4

Trichlorovinylsulfenyl chloride was admixed at the rate of 0.5 gram per gallon of soil with soil inoculated with an active culture of a common root knot disease-producing nematode, *Meloidogyne incognita* var. *acrita*. After three days during which time the treated soil was exposed to the air, cucumber seedlings were planted into the soil. After approximately two weeks, the seedlings were pulled and the roots examined for root knots. The seedlings grown in the treated soil showed almost complete absence of root knots, while seedlings grown in the same inoculated soil without the fumigation treatment were badly damaged by root knots and were in a moribund condition.

For the control of soil pathogens, the compounds of the invention are generally employed at 5–200 pounds per acre, the preferred rate being dependent on soil type, pathogen and crop involved, and other factors well known to the art of soil disinfestation, but generally in the range of 20–100 pounds per acre.

The examples of the composition of our invention, and methods of preparing and utilizing them which have been described in the foregoing specification, have been given for purpose of illustration, not limitation. Many other modifications and ramifications will naturally suggest themselves to those skilled in the art, based on the disclosure of our basic discovery. These are intended to be comprehended within the scope of our invention.

We claim:
1. Trichlorovinylsulfenyl chloride.
2. A process for making a compound of the formula $CX_2=CX-SCl$, wherein X is independently selected from the group consisting of chlorine and bromine, which comprises reacting chlorine gas with

$$CX_2=CX-S-S-CX=CX_2$$

wherein X is independently selected from the group consisting of chlorine and bromine, until a weight increase has occurred corresponding substantially to one molar equivalent of chlorine per mole of $$CX_2=CX-S-S-CX=CX_2$$

and distilling off the $CX_2=CX-SCl$ formed.

References Cited by the Examiner
UNITED STATES PATENTS

| | | | |
|---|---|---|---|
| 2,853,516 | 9/1958 | Louthan | 260—543 |
| 2,884,453 | 4/1959 | Tullock | 260—543 |
| 2,886,593 | 5/1959 | Louthan | 260—543 |
| 2,913,368 | 11/1959 | Birum | 167—22 |
| 2,917,429 | 12/1959 | Scott | 167—22 |

OTHER REFERENCES

Knunyants et al.: "Chem. Abstracts," vol. 50, p. 7069 (1956).

McBee: "Industrial & Engineering Chem.," vol. 40, No. 9, page 1613 (1948).

Fuson et al.: "J. Org. Chem.," vol. 11, pp. 469–472 (1946).

Kharasch: "Organic Sulfur Compounds," vol. 1 (1961), p. 353.

Hickinbottom: "Reactions of Organic Compounds," 2nd ed. (1948), p. 23.

Beilstein: Vol. 1, 2nd addition, pp. 478–479.

R. K. JACKSON, *Primary Examiner.*

W. B. KINGSTON, LEON ZITVER, LORRAINE A. WEINBERGER, *Examiners.*

J. S. LEVITT, F. D. HIGEL, *Assistant Examiners.*